United States Patent Office 3,642,802
Patented Feb. 15, 1972

3,642,802
FURO[2,3-b]QUINOLINE COMPOUNDS
Hajime Fujimura, Kyoto-shi, Tadasu Tanaka, Oomiya-shi, Ikuo Iijima, Toda-shi, Michihiko Miyazaki, Kawa-guchi-shi, and Masao Masaki, Tokyo-to, Japan, assignors to Tanabe Seiyaku Co., Ltd.
No Drawing. Filed Aug. 29, 1969, Ser. No. 854,311
Claims priority, application Japan, Sept. 4, 1968, 43/63,605, 43/63,606, 43/63,607, 43/63,608; Sept. 27, 1968, 43/70,057
Int. Cl. C07d 33/40
U.S. Cl. 260—289       5 Claims

ABSTRACT OF THE DISCLOSURE

A furo[2,3-b]quinoline compounds of the formula:

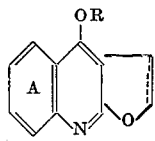

wherein R is lower alkyl, the ring A is substituted with 1 to 4 halogen atoms and a double bond may be present at the place shown by a dotted line, i.e. between the 2 and 3-positions, which is useful as an antiinflammatory, analgesic and/or antipyretic agent.

---

The present invention relates to novel furo[2,3-b]quinoline compounds and production thereof.

The said furo[2,3-b]quinoline compounds are representable by the formula:

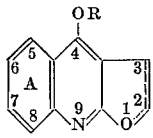  [I]

wherein R is lower alkyl (e.g. methyl, ethyl, propyl, isopropyl, butyl), the ring A is substituted with 1 to 4 halogen atoms (e.g. chlorine, bromine, iodine) and a double bond may be present at the place shown by a dotted line, i.e. between the 2 and 3-positions. The term "lower" herein used is intended to mean the one having 1 to 6 carbon atoms.

A basic object of the present invention is to embody the furo[2,3-b]quinoline compounds [I]. Another object of this invention is to embody the furo[2,3-b]quinoline compound [I] having pharmacological activity. A further object of the invention is to embody a process for the preparation of the furo[2,3-b]quinoline compounds [I]. These and other objects will be apparent to those conversant with the art to which the present invention pertains from the subsequent description.

The objective furo[2,3-b]quinoline compound [I] can be prepared from the 4-halogeno-3-(β-halogenoethyl)-1,2-dihydro-2-oxoquinoline compound of the formula:

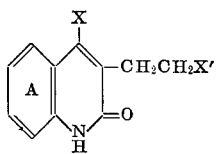  [II]

wherein X and X' are each halogen (e.g. chlorine, bromine, iodine) and the ring A is as defined above according to the following scheme:

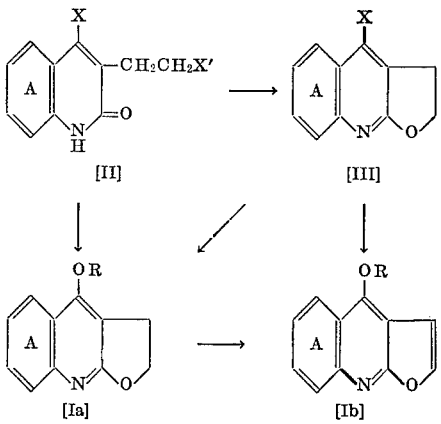

wherein R, X, X' and the ring A are each as defined above.

The starting 4-halogeno compound [II] is novel and may be prepared, for instance, by hydrolyzing the corresponding 2,4 - dihalogeno - 3 - (β-halogenoethyl)-quinoline compound, which is known [cf. Bull. Chem. Soc. Japan, 31, 161 (1958); Chem. & Ind., 1091 (1965); Proc. Jap. Acad., 33, 346 (1957), etc.] or may be produced by a per se conventional procedure [cf. J. Chem. Soc., 2177 (1957), etc.], with aqueous solution of hydrogen halide (e.g. hydrogen chloride, hydrogen bromide) while heating for several hours.

The 4-halogeno compound [II] is first subjected to intra-molecular cyclization. The intra-molecular cyclization may be effected by treating the 4-halogeno compound [II] with a suitable cyclizing agent such as silver oxide, aluminum oxide or alkali alkoxide (e.g. sodium methoxide, sodium ethoxide, potassium ethoxide, lithium ethoxide) in a proper solvent (e.g. methanol, ethanol, propanol), usually at a temperature from room temperature to reflux temperature. The silver oxide, which is preferably employed, is freshly prepared, for instance, by adding sodium hydroxide to an aqueous solution of silver nitrate. The preferred alkali alkoxide concentration is one where said alkoxide is 2 to 10 times the molar amount of the starting 4-halogeno compound [II]. The product in this step is the 4-halogeno 2,3-dihydrofuro[2,3-b] quinoline compound [III] in ordinary cases. However, the use of the alkali alkoxide as the cyclizing agent yields the corresponding 4-lower alkoxy compound [Ia], although the reaction is presumed to proceed through the said 4-halogeno compound [III] as the intermediate.

When the 4-halogeno-2,3-dihydrofuro[2,3-b] quinoline compound [III] is obtained, it is reacted with alkali alkoxide (e.g. sodium methoxide, sodium ethoxide, potassium ethoxide, lithium ethoxide) in a proper solvent (e.g. methanol, ethanol, propanol), usually at a temperature from room temperature to reflux temperature. In general, heating at a relatively high temperature for a comparatively long time should be avoided, because the dihydrofuran ring is unstable to solvolysis in an alkaline medium. Thus, the accomplishment of the reaction below 100° C. for 1 to 5 hours is preferred. The alkali alkoxide is ordinarily employed in a 2 to 5 time molar amount to the 4-halogeno compound [III]. The product in this step is the 4-lower alkoxy-2,3-dihydrofuro[2,3-b]quinoline compound [Ia].

Alternatively, the 4-halogeno compound [III] is reacted with N-bromosuccinimide, the resultant 3-bromo compound is subjected to dehydrobromination and then the resulting 4-halogenofuro[2,3-b]quinoline compound is reacted with alkali alkoxide. These conversions are represented by the following formula:

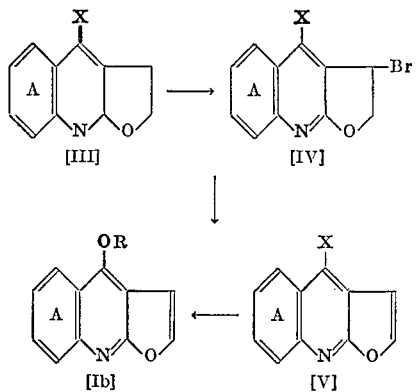

wherein R, X and the ring A are each as defined above. Firstly, the 4-halogeno-2,3-dihydrofuro[2,3-b]quinoline compound [III] may be reacted with N-bromosuccinimide in a suitable solvent (e.g. carbon tetrachloride, chloroform), preferably in the presence of a catalytic amount of a reaction initiator such as benzoyl peroxide while refluxing. Secondly, the resultant 3-bromo-4-halogeno-2,3-dihydrofuro[2,3 - b]quinoline compound [IV] may be heated with an organic base such as triethylamine, diethylamine, collidine or pyridine or with 1,5-diazabicyclo[4,3,0]nonene-5 in a suitable solvent (e.g. benzene, toluene), ordinarily while refluxing. Thirdly, the resulting 4-halogenofuro[2,3-b]quinoline compound [V] may be reacted with alkali alkoxide (e.g. sodium methoxide, sodium ethoxide, potassium ethoxide, lithium ethoxide) in a proper solvent (e.g. methanol, ethanol) at a temperature from room temperature to reflux temperature. The use of the alkali alkoxide in a 1 to 5 time molar amount to the 4-halogeno compound [V] is generally preferred. The product in this route is the 4-lower alkoxyfuro[2,3-b]quinoline compound [Ib].

The 4-lower alkoxy - 2,3 - dihydrofuro[2,3-b]quinoline compound [Ia] obtained in the above course may be, if desired, converted into the corresponding 2,3-unsaturated compound [Ib] by reacting the former with N-bromosuccinimide and treating the resultant 3-bromo compound with a dehydrobrominating agent. The reactions can be performed in the same manner as illustrated above on the conversion of the 4-halogeno compound [III] into the corresponding 2,3-unsaturated compound [V].

The thus prepared furo[2,3-b]quinoline compounds [I] are useful as antiinflammatory, analgesic and/or antipyretic agents. For instance, 4-methoxy-7-chloro-2,3-dihydrofuro[2,3-b]quinoline [Ia: R=CH$_3$; A=bearing chlorine at the 7 position] and 4-methoxy-7-chloro[2,3-b]quinoline [Ib: R=CH; A=bearing chlorine at the 7-position] when orally administered to rats at a dose of 200 mg. per kg. of bodyweight, 1 hour before a subcutaneous injection of 1% carrageenin (0.05 ml.) produced a 64.4% and 34.4% inhibition of edema, respectively, even after 5 hours. Further, for instance, 4-methoxy-7-chloro-2,3-dihydrofuro[2,3-b]quinoline showed a stronger antipyretic activity than phenylbutazone when orally administered at a dose of 100 mg. per kg. of bodyweight to rats which received yeast as a pyrogen substance. Furthermore, for instance, 4-methoxy-7-chloro-2,3-dihydrofuro[2,3-b]quinoline gave ED$_{50}$=16 mg. per kilogram of bodyweight when intraperitoneally administered to mice, the said ED$_{50}$ value being better than those of Benzydamine (ED$_{50}$=22.3 mg./kg.) and aspirin (ED$_{50}$=23 mg./kg.). As the acute toxicity in mice of 4-methoxy-7-chloro-2,3-dihydrofuro[2,3-b]quinoline (LD$_{50}$=450 mg./kg., intraperitoneal route; 2450 mg./kg., oral route) and 4-methoxy-7-chloro-furo[2,3 - b]quinoline (LD$_{50}$=1000 mg./kg., intraperitoneal route) is considerably lower than that of Benzydamine (LD$_{50}$=154 mg./kg., intraperitoneal route; 640 mg./kg., oral route) and aspirin (LD$_{50}$=293 mg./kg. intraperitoneal route; 438 mg./kg., oral route), they have a high degree of safety as therapeutic agents.

In the clinical test, 4-methoxy-7-chloro-2,3-dihydrofuro[2,3-b]quinoline produced a disappearance of the edema and relief of the pain, without any side effect such as abnormality of kidney function and blood, in the patients who received a plastic operation and to whom were orally administered said drug at a daily dose of 600 to 1200 mg. for seven consecutive days. 4-methoxy-7-chlorofuro[2,3-b]quinoline also produced disappearance of the edema and relief of the pain by the oral administration of 600 mg. per day for seven consecutive days.

Practical and presently preferred embodiments of the present invention are illustratively shown in the following examples.

EXAMPLE 1

4,7-dichloro-3-($\beta$ - chloroethyl)-1,2-dihydro-2-oxoquinoline (82.8 g.) is suspended in a mixture of ethanol (5100 ml.) and water (3000 ml.), silver oxide, freshly prepared from silver nitrate (255 g.), is added thereto and the resultant mixture is refluxed for 4 hours. After the reaction is completed, the reaction mixture is filtered and the collected inorganic material is washed with hot ethanol. The filtrate and the washing ethanol are combined and concentrated under reduced pressure to about ⅕ volume. The resultant emulsion is extracted with chloroform. The extract is washed with water, dried, treated with activated carbon and filtered. The filtrate is concentrated under reduced pressure to dryness. The residue is crystallized from methanol to give 4,7-dichloro - 2,3 - dihydrofuro[2,3-b]quinoline (72.1 g.) as colorless needles melting at 98° C.

The starting compound in this example, i.e. 4,7-dichloro-3-($\beta$ - chloroethyl)-1,2-dihydro-2-oxoquinoline, is prepared as follows:

A mixture of 2,4,7-trichloro-3-($\beta$-chloroethyl)-quinoline (59 g.), 7 N hydrochloric acid (1600 ml.) and dioxane (1300 ml.) is refluxed for 4 hours and then allowed to stand at room temperature. The precipitated crystals are collected by filtration, washed with water and dried to give 4,7-dichloro-3-($\beta$-chloroethyl)-1,2-dihydro-2-oxoquinoline (49.7 g.) as crystals with a melting point at 217 to 218° C.

EXAMPLE 2

4,7-dichloro-3-($\beta$-chloroethyl)-1,2-dihydro-2-oxoquinoline (1 g.), aluminum oxide (2 g.) and ethanol (50 ml.) are refluxed for 30 hours. The reaction mixture is filtered while hot and the collected material is washed with hot ethanol. The filtrate and the washing ethanol are combined and concentrated under reduced pressure. The residue is chromatographed on silica gel and eluted with chloroform. After recovery of the starting compound (700 mg.), 4,7-dichloro-2,3-dihydrofuro[2,3-b]quinoline (90 mg.) is obtained. Recrystallization from methanol yields colorless needles having a melting point at 98° C.

EXAMPLE 3

4,7-dichloro-3-($\beta$-chloroethyl)-1,2-dihydro-2-oxoquinoline (1.38 g.) is added to a methanolic solution of sodium methoxide prepared from metallic sodium (1.15 g.) and anhydrous methanol (50 ml.), and the resultant mixture is refluxed for 3 hours. After cooling, the reaction mixture is poured into ice water and extracted with chloroform. The chloroform extract is washed with water, dried and concentrated. The residue is chromatographed on silica gel. The eluate with chloroform is concentrated and crystallized from benzene to give 4-methoxy-7-chloro-2,3-dihydrofuro[2,3-b]quinoline (450 mg.) as colorless needles melting at 122° C.

EXAMPLE 4

To a solution of metallic sodium (10 g.) in anhydrous methanol (300 ml.) is added 4,7-dichloro-2,3-dihydrofuro[2,3-b]quinoline (10.0 g.), and the resultant mixture is refluxed for 3.5 hours. The reaction mixture is concentrated under reduced pressure. The residue is admixed with water and extracted with chloroform. The chloroform extract is washed with water, dried and concentrated. The residue is crystallized from benzene to give 4-methoxy-7-chloro-2,3-dihydrofuro[2,3-b]quinoline (7.4 g.) as colorless needles having a melting point at 122 to 123° C.

EXAMPLE 5

To a solution of metallic sodium (3.0 g.) in anhydrous n-butanol (90 ml.) is added 4,7-dichloro-2,3-dihydrofuro[2,3-b]quinoline (3.0 g.), and the resultant mixture is heated at 50 to 60° C. for 4 hours. After cooling the reaction mixture is poured into ice water and extracted with chloroform. The chloroform extract is washed with water, dried and concentrated. The residue is treated with petroleum ether. The crystallized material is recrystallized from n-hexane to give 4-n-butoxy-7-chloro-2,3-dihydrofuro[2,3-b]quinoline (450 mg.) as colorless needles having a melting point at 53° C.

EXAMPLE 6

A mixture of 4,7-dichloro-2,3-dihydrofuro[2,3-b]quinoline (9.0 g.), N-bromosuccinimide (9.0 g.), benzoyl peroxide (0.01 g.) and carbon tetrachloride (300 ml.) is refluxed for 2 hours. The precipitated crystals are collected by filtration and washed with carbon tetrachloride. The filtrate and the washing carbon tetrachloride are combined and concentrated under reduced pressure to obtain brown oil. The oil is dissolved in benzene (200 ml.). 1,5-diazabicyclo[4,3,0]nonene-5 (18 g.) is added thereto and the resultant mixture is refluxed for 50 minutes. After cooling the benzene layer is washed with water, dried and concentrated to give dark brown residue (5.0 g.). The residue is dissolved in methanolic solution of sodium methoxide prepared from metallic sodium (5.0 g.) and methanol (250 ml.), and the resultant mixture is refluxed for 45 minutes. After cooling, the reaction mixture is poured into ice water and extracted with benzene. The benzene extract is washed with water, dried and concentrated. The residue is washed with a small amount of methanol and crystallized from methanol to give 4-methoxy-7-chlorofuro-2,3-b-quinoline (2.06 g.) as colorless needles having a melting point at 196 to 197° C.

EXAMPLE 7

A mixture of 4,7-dichloro-2,3-dihydrofuro-2,3-b-quinoline (4.37 g.), N-bromosuccinimide (4.37 g.), benzoyl peroxide (0.01 g.) and carbon tetrachloride (170 ml.) is refluxed for 30 minutes. The reaction mixture is allowed to stand at room temperature. The precipitated crystals are collected by filtration and washed with carbon tetrachloride. The filtrate and the washing carbon tetrachloride are combined and concentrated under reduced pressure. The resultant pale yellow oil is crystallized from ether to give 3-bromo-4,7-dichloro-2,3 - dihydrofuro[2,3 - b]quinoline (4.6 g.) as colorless crystals having a melting point at 181 to 182° C.

The 3-bromo compound (2.0 g.) is admixed with collidine (20 ml.), and the resultant mixture is heated at 160° C. for 40 minutes. The reaction mixture is concentrated under reduced pressure. The residue is extracted with benzene. The benzene extract is treated with activated carbon and concentrated. The residue is washed with a small amount of methanol to give 4,7-dichlorofuro[2,3-b]quinoline (0.673 g.) as colorless needles having a melting point at 138 to 139° C.

The 4-chloro compound (1 g.) is added to a methanolic solution of sodium methoxide prepared from metallic sodium (1.1 g.) and anhydrous methanol (30 ml.), and the resultant mixture is refluxed for 20 minutes. After cooling, the crystals are collected by filtration and washed with anhydrous methanol. The crystals are then recrystallized from methanol to give 4-methoxy-7-chlorofuro-2,3-b-quinoline (0.6 g.) as colorless needles having a melting point at 197 to 198° C.

EXAMPLE 8

A mixture of 4,7-dichloro-2,3-dihydrofuro[2,3-b]quinoline (3.0 g.), N-bromosuccinimide (3.2 g.), benzoyl peroxide (0.01 g.) and carbon tetrachloride (100 ml.) is refluxed for 2 hours. After cooling, the precipitate is collected by filtration and washed with carbon tetrachloride. The filtrate and the washing carbon tetrachloride are combined and concentrated under reduced pressure. The residue is dissolved in diethylamine (30 ml.) and refluxed for 3 hours. The reaction mixture is distilled under reduced pressure. The residue is crystallized from methanol to give 4,7-dichlorofuro[2,3-b]quinoline (1.34 g.) as colorless needles having a melting point at 138 to 139° C. This substance is converted into 4-methoxy-7-chlorofuro[2,3-b]quinoline in the same manner as described in Example 7.

EXAMPLE 9

A suspension of 4-methoxy-7-chloro-2,3-dihydrofuro-[2,3-b]quinoline (5.0 g.) N-bromosuccinimide (6.0 g.) and benzoyl peroxide (0.01 g.) in anhydrous carbon tetrachloride (300 ml.) is refluxed for 2.5 hours. After cooling, the carbon tetrachloride layer is washed successively with a 2% sodium hydroxide solution and with water and dried. After concentrating under reduced pressure, the remaining crude bromo compound is dissolved in benzene (300 ml.) and 1,5-diazabicyclo[4,3,0]nonene-5 (8.0 g.) is added thereto. The resultant mixture is refluxed for 1 hour. After cooling, the benzene layer is washed with water, dried and concentrated. The residue is crystallized from methanol to give 4-methoxy-7-chlorofuro[2,3-b] quinoline (2.31 g.) as colorless needles having a melting point at 195 to 197° C.

EXAMPLE 10

A suspension of 4-methoxy-7-chloro-2,3-dihydrofuro-[2,3-b] quinoline (0.57 g.), N-bromosuccinimide (0.57 g.), sodium bicarbonate (1 g.) and benzoyl peroxide (0.01 g.) in carbon tetrachloride (60 ml.) is refluxed for 2 hours. After cooling, the reaction mixture is washed successively with a 2% sodium hydroxide solution and with water, dried and concentrated. The residue is crystallized from methanol to give 3-bromo-4-methoxy-7-chloro-2,3-dihydrofuro [2,3-b] quinoline (0.45 g.) as colorless needles having a melting point at 193 to 194° C.

The 3-bromo compound (2.0 g.) and 1,5-diazabicyclo-[4,3,0] nonene-5 (2.5 g.) are dissolved in benzene (120 ml.), and the resultant mixture is refluxed for 20 minutes. After cooling, the benzene layer is washed with water, dried and concentrated. The pale yellow residue (1.3 g.) is crystallized from benzene to give 4-methoxy-7-chlorofuro [2,3-b] quinoline (1.1 g.) as colorless needles having a melting point at 196 to 197° C.

We claim:
1. A furo [2,3-b] quinoline compound of the formula:

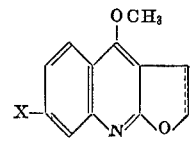

wherein X is a halogen atom and a dotted line is an optional double bond.
2. 4-methoxy-7-halo-2,3-dihydrofuro [2,3-b] quinoline.
3. 4-methoxy-7-halofuro [2,3-b] quinoline.

4. 4-methoxy-7-chloro-2,3-dihydrofuro [2,3-b] quinoline.

5. 4-methoxy-7-chlorofuro [2,3-b] quinoline.

References Cited

UNITED STATES PATENTS

| | | | |
|---|---|---|---|
| 2,650,226 | 8/1953 | Andersag et al. | 260—289 X |
| 2,895,956 | 7/1959 | Tuppy | 260—289 |
| 3,287,459 | 11/1966 | Zimmer | 260—289 |
| 3,506,667 | 4/1970 | Kaminsky | 260—289 X |

OTHER REFERENCES

Pene et al.: Bull. Soc. Chem. France 1966, pp. 586–594.

DONALD G. DAUS, Primary Examiner

U.S. Cl. X.R.

260—283; 424—258